(12) United States Patent
Segawa

(10) Patent No.: US 8,940,657 B2
(45) Date of Patent: Jan. 27, 2015

(54) EXHAUST EMISSION CONTROL CATALYST

(75) Inventor: Yoshihide Segawa, Obu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/128,394

(22) PCT Filed: May 31, 2012

(86) PCT No.: PCT/JP2012/064184
§ 371 (c)(1),
(2), (4) Date: Dec. 20, 2013

(87) PCT Pub. No.: WO2012/176605
PCT Pub. Date: Dec. 27, 2012

(65) Prior Publication Data
US 2014/0113807 A1 Apr. 24, 2014

(30) Foreign Application Priority Data
Jun. 24, 2011 (JP) .................. 2011-140237

(51) Int. Cl.
B01J 23/00 (2006.01)
B01J 23/02 (2006.01)
(Continued)

(52) U.S. Cl.
CPC .............. *B01J 23/63* (2013.01); *B01J 37/0244* (2013.01); *B01J 35/0033* (2013.01); *B01D 53/945* (2013.01); *B01J 2523/00* (2013.01);
(Continued)

(58) Field of Classification Search
USPC ......... 502/261–263, 304, 326, 327, 332, 334, 502/339, 349, 355, 415, 439, 527.12, 502/527.13
See application file for complete search history.

(56) References Cited

U.S. PATENT DOCUMENTS 6,335,305 B1* 1/2002 Suzuki et al. ................. 502/325
6,514,905 B1* 2/2003 Hanaki et al. ................. 502/328
(Continued)

FOREIGN PATENT DOCUMENTS

EP 1 952 884 8/2008
JP 2004-195327 7/2004
(Continued)

*Primary Examiner* — Cam N. Nguyen
(74) *Attorney, Agent, or Firm* — Finnegan, Henderson, Farabow, Garrett & Dunner, LLP

(57) ABSTRACT

An exhaust emission control catalyst disclosed herein is equipped with a rhodium catalytic layer and a platinum catalytic layer, and is characterized in that a relationship between a mole average (X) of a Pauling's electronegativity that is calculated as to elements included in the rhodium catalytic layer except platinum group elements and oxygen and a mole average (Y) of a Pauling's electronegativity that is calculated as to elements included in the platinum catalytic layer except platinum group elements and oxygen is $1.30 \leq X \leq 1.45$ and $1.47 \leq Y \leq 2.0$. According to this exhaust emission control catalyst, an interlayer transfer of platinum and/or rhodium and the alloying of platinum and/or rhodium are suppressed during use of the catalyst, and high exhaust gas purification performance can be exerted.

10 Claims, 2 Drawing Sheets

(51) Int. Cl.
*B01J 23/08* (2006.01)
*B01J 23/40* (2006.01)
*B01J 23/42* (2006.01)
*B01J 23/56* (2006.01)
*B01J 20/00* (2006.01)
*B01J 21/04* (2006.01)
*B01J 23/63* (2006.01)
*B01J 37/02* (2006.01)
*B01J 35/00* (2006.01)
*B01D 53/94* (2006.01)

(52) U.S. Cl.
CPC . *B01D 2255/1021* (2013.01); *B01D 2255/1025* (2013.01); *B01D 2255/2065* (2013.01); *B01D 2255/20715* (2013.01); *B01D 2255/2092* (2013.01); *B01D 2255/407* (2013.01); *B01D2255/9022* (2013.01); *B01D 2255/9207* (2013.01); *Y02T 10/22* (2013.01); *Y10S 502/52712* (2013.01); *Y10S 502/52713* (2013.01)
USPC ........... 502/261; 502/262; 502/263; 502/304; 502/326; 502/327; 502/332; 502/334; 502/339; 502/349; 502/355; 502/415; 502/439; 502/527.12; 502/527.13

(56) References Cited

U.S. PATENT DOCUMENTS

| | | | |
|---|---|---|---|
| 6,852,665 B2 * | 2/2005 | Morikawa et al. | 502/302 |
| 6,864,214 B2 * | 3/2005 | Uenishi et al. | 502/304 |
| 7,081,430 B2 * | 7/2006 | Uenishi et al. | 502/327 |
| 7,407,911 B2 * | 8/2008 | Yeo | 502/304 |
| 7,501,098 B2 * | 3/2009 | Chen et al. | 422/177 |
| 7,517,510 B2 * | 4/2009 | Chen et al. | 423/213.2 |
| 7,547,659 B2 * | 6/2009 | Moon et al. | 502/439 |
| 7,550,124 B2 * | 6/2009 | Chen et al. | 423/213.2 |
| 7,749,472 B2 * | 7/2010 | Chen et al. | 423/213.2 |
| 7,758,834 B2 * | 7/2010 | Chen et al. | 423/213.2 |
| 7,759,283 B2 * | 7/2010 | Yamato et al. | 502/339 |
| 7,795,172 B2 * | 9/2010 | Foong et al. | 502/327 |
| 7,816,300 B2 * | 10/2010 | Takeuchi et al. | 502/325 |
| 7,875,250 B2 * | 1/2011 | Nunan | 422/177 |
| 7,875,573 B2 * | 1/2011 | Beutel et al. | 502/339 |
| 7,977,276 B2 * | 7/2011 | Kikuchi et al. | 502/325 |
| 8,007,750 B2 * | 8/2011 | Chen et al. | 423/239.1 |
| 8,067,330 B2 * | 11/2011 | Suzuki et al. | 502/302 |
| 8,202,819 B2 * | 6/2012 | Kohara et al. | 502/304 |
| 8,211,392 B2 * | 7/2012 | Grubert et al. | 423/213.2 |
| 8,211,824 B2 * | 7/2012 | Akamine et al. | 502/332 |
| 8,227,374 B2 * | 7/2012 | Sato et al. | 502/339 |
| 8,337,791 B2 * | 12/2012 | Kohara et al. | 423/213.2 |
| 8,551,908 B2 * | 10/2013 | Satou et al. | 502/327 |
| 8,568,675 B2 * | 10/2013 | Deeba et al. | 423/213.5 |
| 2008/0318769 A1 | 12/2008 | Wakamatsu et al. | |
| 2009/0203515 A1 | 8/2009 | Murabayashi | |

FOREIGN PATENT DOCUMENTS

| | | |
|---|---|---|
| JP | 2005-334801 | 12/2005 |
| JP | 2006-43634 | 2/2006 |
| JP | 2009-281192 | 12/2009 |
| JP | 2010-51847 | 3/2010 |

* cited by examiner

US 8,940,657 B2

EXHAUST EMISSION CONTROL CATALYST

CROSS-REFERENCE TO RELATED APPLICATIONS

This application is a national phase application of International Application No. PCT/JP20121064184, filed May 31, 2012, and claims the priority of Japanese Application No. 2011-140237, filed Jun. 24, 2011, the content of both of which is incorporated herein by reference.

TECHNICAL FIELD

The invention relates to an exhaust emission control catalyst. More specifically, the invention relates to a carrier of an exhaust emission control catalyst with excellent purification performance.

BACKGROUND ART

As exhaust emission control catalysts for efficiently purifying carbon monoxide (CO), hydrocarbons (HC), nitrogen oxides (NOx) and the like that are discharged from internal combustion engines, three-way catalysts have been in widespread use. As a representative configuration of a three-way catalyst, it is possible to mention a configuration in which one or a plurality of catalytic metals that are selected from platinum (Pt), palladium (Pd), rhodium (Rh) and the like as platinum group elements are supported on a surface of a porous carrier that is made of oxides having high heat resistance.

In each of the aforementioned exhaust emission control catalyst, there is sort of good or bad affinity between the used catalytic metals and the porous carrier, and there is a suitable combination depending on various objects such as an improvement in catalytic performance, the enhancement of manufacturing efficiency and the like. For example, conventionally, studies have been conducted on the composition and the like of a porous carrier capable of effectively suppressing the sintering (grain growth) under a high-temperature condition of a certain catalytic metal in the case where the catalytic metal is adopted. Besides, attempts have been made to define the range of a suitable combination by focusing attention on the electronegativity related to the aforementioned catalytic metal elements or elements constituting the aforementioned carrier as an index for systematically controlling and understanding a suitable combination of catalytic metals and a carrier composition as described above (e.g., Patent Documents 1 to 3).

By the way, in the case where two or more catalytic metals are used as the aforementioned catalytic metals, the catalytic activity may deteriorate due to a decrease in specific surface area resulting from the sintering of the catalytic metals or due to the alloying of a plurality of catalytic metals or the like, in the process of using the catalyst under a high-temperature condition (e.g., 800 to 1000° C.). Thus, with a view to suppressing the occurrence of these phenomena, it has been proposed to spatially separate the aforementioned two or more catalytic metals from one another, have them supported on different carriers respectively, and realize a multilayer-type catalyst configuration (typically a double-layer-type laminate structure). For example, in Patent Document 4, there is disclosed an exhaust emission control catalyst with a first catalytic layer that has platinum (Pt) supported on a surface of a substrate, and a second catalytic layer that has rhodium (Rh) supported on the first catalytic layer.

RELATED ART DOCUMENTS

Patent Documents

Patent Document 1: Japanese Patent Application Publication No. 2009-281192 (JP-2009-281192 A)
Patent Document 2: Japanese Patent Application Publication No, 2006-43634 (JP-2006-43634A)
Patent Document 3: Japanese Patent Application Publication No. 2004-195327 (JP-2004-195327 A)
Patent Document 4: Japanese Patent Application Publication. No. 2010-51847 (JP-2010-51847 A)

SUMMARY OF THE INVENTION

In the conventional art, an exhaust emission control catalyst having at least two or more catalytic layers (e.g., an exhaust emission control catalyst having a rhodium catalytic layer and a platinum catalytic layer) as described in the aforementioned Patent Document 4 is often formed by laminating the respective catalytic layers on one another after independently optimizing a combination of catalytic metals and a carrier composition mainly in each of the catalytic layers. Specifically, for example, zirconia and alumina tend to be adopted as a carrier of rhodium from the standpoint of suppressing the sintering of rhodium, whereas oxides with relatively high basicity such as ceria and the like tend to be adopted as a carrier of platinum for the purpose of suppressing the sintering of platinum.

That is, conventionally, although a great deal of inspections have been carried out on the factors of a catalytic deterioration in each of the catalytic layers (e.g., the sintering of catalytic metals and the like), factors of a catalytic deterioration ascribable to a phenomenon that can arise among the respective layers have not been considered much. However, in the actual process of using a multilayer-type catalyst, the catalytic metal that ought to have been supported on each of the catalytic layers transfers among the layers, and comes into contact with the catalytic metal on the other layers. Then, both the catalytic metals are alloyed to cause a problem of a deterioration in catalytic activity.

The invention has been created to solve this problem. It is an object of the invention to provide an exhaust emission control catalyst that has a rhodium catalytic layer and a platinum catalytic layer, and suppresses an interlayer transfer of platinum and/or rhodium as catalytic metals and hence the alloying of the catalytic metals to thereby achieve an improvement in purification performance.

As a result of carrying out inspections from various angles, the inventors have come to create the invention capable of realizing the aforementioned object.

That is, an exhaust emission control catalyst disclosed herein is equipped with a substrate and a catalytic layer that is formed on a surface of the substrate. Besides, the aforementioned catalytic layer is equipped with a rhodium catalytic layer, which is equipped with a first carrier and rhodium supported on the first carrier, and a platinum catalytic layer, which is equipped with a second carrier and platinum supported on the second carrier. Furthermore, the exhaust emission control catalyst is characterized in that a relationship between a mole average (X) of a Pauling's electronegativity that is calculated as to elements included in the aforementioned rhodium catalytic layer except platinum group elements and oxygen and a mole average (Y) of a Pauling's electronegativity that is calculated as to elements included in the aforementioned platinum catalytic layer except platinum group elements and oxygen is $1.30 \leq X \leq 1.45$ and $1.47 \leq Y \leq 2.0$.

It should be noted herein that "the Pauling's electronegativity" or "the electronegativity" in the present specification means an electronegativity propounded in the third edition of "The Nature of the Chemical Bond", which was written by Linus Pauling and published by Cornell University Press (in 1960), and the concrete numerical value thereof is defined to be a value of the electronegativity described in the above book.

According to the exhaust emission control catalyst in which the value of X according to the aforementioned rhodium catalytic layer and the value of Y according to the aforementioned platinum catalytic layer are within the aforementioned ranges respectively, even in the case where the catalyst is used under a high-temperature condition (e.g., 800 to 1000° C.), platinum supported on the aforementioned platinum catalytic layer is restrained from making an interlayer transfer to the rhodium catalytic layer. As a result, the alloying of platinum and rhodium is suppressed, and an improvement in the purification performance (typically, an improvement in the NOx purification performance) of the aforementioned exhaust emission control catalyst, the enhancement of heat resistance of the aforementioned exhaust emission control catalyst, and the prolongation of life span of the aforementioned exhaust emission control catalyst can be achieved.

Besides, according to the exhaust emission control catalyst in which the value of X in the aforementioned rhodium catalytic layer is within the aforementioned range, in the process of using the catalyst under a high-temperature condition (e.g., 800 to 1000° C.), the grain growth (sintering) of rhodium in the aforementioned rhodium catalytic layer is suppressed. Thus, in this exhaust emission control catalyst, the performance of reducing NOx is improved especially under a high-temperature condition.

Incidentally, in general, the electronegativity of elements except oxygen in an oxide tends to be correlated with the acidity or basicity of the oxide. Specifically, an example of Ceria ($CeO_2$), alumina ($Al_2O_3$) and silica ($SiO_2$), which are oxides that can be adopted as carriers of the exhaust emission control catalyst according to the invention, will be described. As for ceria as an oxide exhibiting relatively high basicity, the electronegativity of the element except oxygen (cerium) in the oxide is relatively small (the electronegativity of cerium: 1.1). On the other hand, as for alumina and silica as oxides exhibiting relatively high acidity, the electronegativity of elements except oxygen (aluminum and silicon) in the oxide is relatively large (the electronegativity of aluminum: 1.5, the electronegativity of silicon: 1.8). That is, the acidity of an oxide constituted of an element and oxygen generally tends to increase as the electronegativity of the element increases.

It should be noted herein that if the value of X according to the aforementioned rhodium catalytic layer and the value of Y according to the aforementioned platinum catalytic layer are within the aforementioned ranges disclosed in the present specification respectively, there is inevitably established a relationship: $X<Y$. Consequently, if the aforementioned X and the aforementioned Y are within the aforementioned ranges respectively, the second carrier according to the aforementioned platinum catalytic layer tends to be constituted of an oxide exhibiting higher acidity than the first carrier according to the aforementioned rhodium catalytic layer.

As described above, in the conventional arts, an oxide exhibiting high basicity tends to be adopted for a carrier in a platinum catalytic layer. Therefore, the technical concept according to the invention can be regarded as a contradiction to the technical concepts according to these conventional arts.

In one preferred aspect of the exhaust emission control catalyst disclosed herein, the aforementioned platinum catalytic layer is formed on the surface of the aforementioned substrate in the aforementioned catalytic layer, and the aforementioned rhodium catalytic layer is formed on a surface of the aforementioned platinum catalytic layer that is not in contact with the substrate in the aforementioned catalytic layer, so that the aforementioned catalytic layer is formed in a laminate structure.

According to this exhaust emission control catalyst, the catalytic layer with which exhaust gas containing a large amount of noxious components to be purified first comes into contact is the aforementioned rhodium catalytic layer. Therefore, the purification performance of the aforementioned rhodium catalyst can be leveraged to the utmost, and this exhaust emission control catalyst can exert high NOx purification performance. Besides, in the aforementioned platinum catalytic layer with which exhaust gas subsequently comes into contact, the sintering of platinum and the catalyst poisoning of platinum are suppressed, so that the platinum catalytic layer can be restrained from deteriorating in a process of using the catalyst. Thus, this exhaust emission control catalyst can exert excellent three-way catalytic function as a catalyst as a whole.

Another preferred aspect of the exhaust emission control catalyst disclosed herein is characterized in that the aforementioned first carrier in the aforementioned rhodium catalytic layer includes at least one of $CeO_2$, $ZrO_2$ and $Al_2O_3$.

According to this exhaust emission control catalyst, both high heat resistance and excellent purification performance can be achieved.

Besides, still another preferred aspect of the exhaust emission control catalyst disclosed herein is characterized in that the aforementioned second carrier in the aforementioned platinum catalytic layer includes at least one of $Al_2O_3$ and $SiO_2$.

According to this exhaust emission control catalyst, both higher heat resistance and more excellent purification performance can be achieved.

Still another preferred aspect of the exhaust emission control catalyst disclosed herein is characterized in that a content by percentage accounted for by $CeO_2$ in the aforementioned second carrier is equal to or smaller than 10 mass % if the aforementioned second carrier in the aforementioned platinum catalytic layer is assumed to be 100 mass %.

According to this exhaust emission control catalyst, the value of Y according to the aforementioned platinum catalytic layer becomes high (or the base point in the aforementioned second carrier decreases), so that an interlayer transfer of platinum supported on the aforementioned platinum catalytic layer can be further suppressed. As a result, this exhaust emission control catalyst exhibits high purification performance (especially high NOx purification performance).

Still another preferred aspect of the exhaust emission control catalyst disclosed herein is characterized in that the aforementioned second carrier in the aforementioned platinum catalytic layer does not substantially contain $CeO_2$.

According to this exhaust emission control catalyst, the value of Y according to the aforementioned platinum catalytic layer becomes higher (or the base point in the aforementioned second carrier further decreases), so that an interlayer transfer of platinum supported on the aforementioned platinum catalytic layer can be further suppressed. As a result, this exhaust emission control catalyst exhibits high purification performance (especially high NOx purification performance).

Still another preferred aspect of the exhaust emission control catalyst disclosed herein is characterized in that the aforementioned second carrier in the aforementioned platinum catalytic layer does not substantially contain $ZrO_2$.

According to this exhaust emission control catalyst, the value of Y according to the aforementioned platinum catalytic layer becomes higher (or the base point in the aforementioned second carrier further decreases), so that an interlayer transfer of platinum supported on the aforementioned platinum catalytic layer can be further suppressed. As a result, this exhaust emission control catalyst exhibits high purification performance.

Incidentally, in the present specification, the expression "does not substantially contain $CeO_2$ (or $ZrO_2$)" means refraining from artificially (intentionally) mixing $CeO_2$ (or $ZrO_2$) into the catalyst during fabrication thereof, and is a term that allows a slight amount of $CeO_2$ (or $ZrO_2$) to be mixed into the catalyst from the other layer during fabrication of the catalyst or at the stage of use thereof.

Still another preferred aspect of the exhaust emission control catalyst disclosed herein is characterized in that a content by percentage accounted for by the aforementioned $Al_2O_3$ in the aforementioned second carrier is 20 to 70 mass %, and a content by percentage of the aforementioned $SiO_2$ is 30 to 80 mass % if the aforementioned second carrier in the aforementioned platinum catalytic layer is assumed to be 100 mass %.

According to this exhaust emission control catalyst, the value of Y according to the aforementioned platinum catalytic layer tends to be relatively high (or the acidity of the aforementioned second carrier tends to be relatively high). Therefore, an interlayer transfer of platinum supported on the aforementioned platinum catalytic layer is suppressed, and the catalyst is restrained from deteriorating due to the alloying of the aforementioned rhodium and the aforementioned platinum. Besides, $Al_2O_3$ or $SiO_2$ has high heat resistance and high specific surface area. Therefore, this exhaust emission control catalyst exerts high purification performance even during use of the catalyst under a high-temperature condition (e.g., 800 to 1000° C.).

Still another preferred aspect of the exhaust emission control catalyst disclosed herein is characterized in that a content by percentage accounted for by the aforementioned $CeO_2$ in the aforementioned first carrier is 10 to 40 mass %, a content by percentage of the aforementioned $ZrO_2$ is 20 to 40 mass %, and a content by percentage of the aforementioned $Al_2O_3$ is 20 to 60 mass % if the aforementioned first carrier in the aforementioned rhodium catalytic layer is assumed to be 100 mass %.

According to this exhaust emission control catalyst, even in the case where the catalyst bed temperature becomes high (e.g., 800 to 1000° C.), the sintering of rhodium supported on the aforementioned rhodium catalytic layer is suppressed, and the catalyst is restrained from deteriorating.

Still another preferred aspect of the exhaust emission control catalyst disclosed herein is characterized by being an exhaust emission control catalyst that is used as an underfloor catalyst for a motor vehicle.

The exhaust emission control catalyst disclosed herein exhibits high purification performance for carbon monoxide (CO), hydrocarbons (HC), and nitrogen oxides (NOx) due to three-way purification performance. The exhaust emission control catalyst is excellent in the performance of reducing NOx especially due to the action of the aforementioned rhodium catalytic layer, and is also excellent in the performance of oxidizing flame-retardant hydrocarbons (methane, paraffin and the like) especially due to the action of the aforementioned platinum catalytic layer. Thus, this exhaust emission control catalyst is especially suitable as an under floor catalyst for a motor vehicle.

MODE FOR CARRYING OUT THE INVENTION

A preferred embodiment of the invention will be described hereinafter. Incidentally, a matter that is needed to carry out the invention except those specifically mentioned in the present specification can be grasped as a matter of design variation based on the conventional art in the relevant field. The invention can be carried out on the basis of the content disclosed in the present specification and common general technical knowledge in the relevant field. Incidentally, an exhaust emission control catalyst according to the invention is not limited to the following embodiment thereof, but can be realized in various forms after being subjected to modifications, improvements and the like that can be made by those skilled in the art, without departing the gist of the invention.

The exhaust emission control catalyst disclosed herein is equipped with a substrate and a catalytic layer that is formed on a surface of the substrate. It should be noted herein that various materials in various forms, which have conventionally been used for this kind of purpose, can be used as the aforementioned substrate. For example, a honeycomb substrate equipped with a honeycomb structure formed from a ceramic such as silicon carbide, cordierite exhibiting high resistance to thermal shock or the like or an alloy (stainless or the like), and the like can be suitably adopted. As an example, it is possible to mention a honeycomb substrate that has a cylindrical outer shape, is provided with through-holes (cells) as exhaust gas passages in the direction of a cylinder axis thereof and has partitions (rib walls) which partition the respective cells from one another and with which exhaust gas can come into contact. It is appropriate to adopt an elliptical cylindrical shape or a polygonal cylindrical shape instead of the aforementioned cylindrical shape, as the outer shape of the entire substrate.

Figure 1:
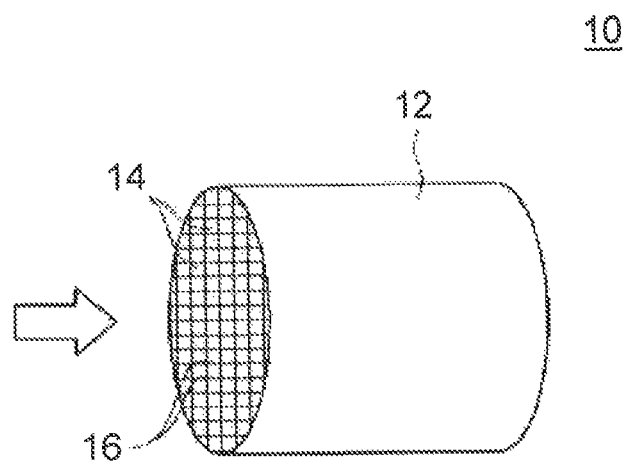
FIG. 1 is an overall view of an exhaust emission control catalyst according to one embodiment of the invention.

FIG. 1 is a schematic view of a typical example of the exhaust emission control catalyst disclosed herein. That is, an exhaust emission control catalyst 10 according to this embodiment of the invention is equipped with a plurality of regularly arranged cells 14, and a honeycomb substrate 12 having rib walls 16 that constitute the cells 14.

Besides, the aforementioned catalytic layer constituting the exhaust emission control catalyst 10 disclosed herein is equipped with a rhodium catalytic layer and a platinum catalytic layer.

It should be noted herein that the aforementioned rhodium catalytic layer and the aforementioned platinum catalytic layer are not limited in arrangement in particular, and can assume various configurations. For example, it is possible to adopt a configuration in which the aforementioned rhodium catalytic layer and the aforementioned platinum catalytic layer are formed on the substrate in such a manner as to randomly continue to each other along the flow direction of exhaust gas. Besides, for example, it is also possible to adopt a configuration in which the aforementioned platinum catalytic layer (or the aforementioned rhodium catalytic layer) is formed on the surface of the substrate, and the aforementioned rhodium catalytic layer (or the aforementioned platinum catalytic layer) is formed on the surface of the platinum catalytic layer (or the rhodium catalytic layer), whereby an laminate structure having an upper layer and a lower layer is formed.

Figure 2:
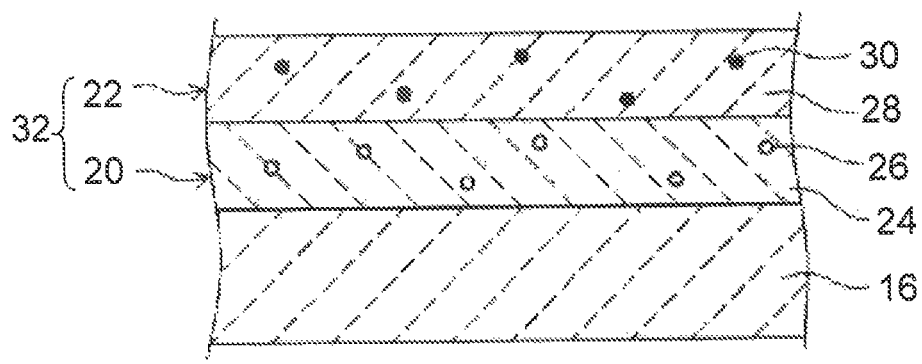
FIG. 2 is a view showing a configuration of a rib region in the exhaust emission control catalyst of FIG. 1, and is a view schematically illustrating a catalytic configuration of the exhaust emission control catalyst according to the embodiment of the invention.

FIG. 2 is a view illustrating one form of the exhaust emission control catalyst 10 disclosed herein. Incidentally, FIG. 2 is also a view schematically showing, on an enlarged scale, the configuration of a surface region of the rib walls (hereinafter referred to also as "the substrate") 16 of the honeycomb substrate 12 in the exhaust emission control catalyst 10 shown in FIG. 1.

As shown in FIG. 2, in one embodiment of the exhaust emission control catalyst 10 disclosed herein, the aforementioned platinum catalytic layer 20 is formed on the surface of the substrate 16, and the aforementioned rhodium catalytic layer 22 is formed on the surface of the aforementioned platinum catalytic layer 20, so that a catalytic layer 32 is formed. The aforementioned platinum catalytic layer 20 is equipped with a second carrier 24, and platinum (Pt particles) 26 that is supported on the second carrier 24. Besides, the aforementioned rhodium catalytic layer 22 that is formed on the surface of the aforementioned platinum catalytic layer 20 is equipped with a first carrier 28, and rhodium (Rh particles) 30 that is supported on the first carrier 28.

Besides, the aforementioned catalytic layer 32 constituting the exhaust emission control catalyst 10 disclosed herein is characterized in that a relationship between a mole average (X) of a Pauling's electronegativity that is calculated as to elements included in the aforementioned rhodium catalytic layer 22 except platinum group elements and oxygen and a mole average (Y) of a Pauling's electronegativity that is calculated as to elements included in the aforementioned platinum catalytic layer 20 except platinum group elements and oxygen is 1.30≤X≤1.45 (more preferably 1.35≤X≤1.40) and 1.47≤Y≤2.0 (more preferably Y≥1.60, and still more preferably Y≥1.70).

It should be noted herein that the concrete numerical value of "the Pauling's electronegativity" adopted in the present specification is, as described above, the value of the electronegativity described in the third edition of "The Nature of the Chemical Bond" written by Pauling (in 1960). Table 1 shows an extract of values of the electronegativity of various elements described in the aforementioned book written by Pauling.

TABLE 1

| | Element | | | | | |
|---|---|---|---|---|---|---|
| | Ba | Sr | Ce | Pr | Nd | La |
| Pauling's Electronegativity* | 0.9 | 1.0 | 1.1 | 1.1 | 1.1 | 1.1 |

TABLE 1-continued

| | Element | | | | | |
|---|---|---|---|---|---|---|
| | Y | Mg | Zr | Al | Si | P |
| Pauling's Electronegativity* | 1.2 | 1.2 | 1.4 | 1.5 | 1.8 | 2.1 |

Source: L. Pauling, "The Nature of the Chemical Bond", 3$^{rd}$ ed., Cornell Univ. Press (1960)

It should be noted herein that the mole average of the aforementioned electronegativity indicates an average of the electronegativity that has been weighed by a content by percentage (a mole concentration) of a target element. Specifically, this value is obtained by obtaining a value obtained by multiplying azo electronegativity of a certain element by a mixed quantity of a raw material or a content by percentage (a mole concentration) of the element calculated through elemental analysis of a test sample, and summating these values as to the respective target elements.

If X according to the aforementioned rhodium catalytic layer 22 is much smaller than 1.30, the supported rhodium 30 is in an oxidized state, and the purification activity tends to deteriorate. Besides, if the aforementioned X is much larger than 1.45, the sintering of the aforementioned rhodium 30 may be promoted. Therefore, this option is not very favorable. If Y according to the aforementioned platinum catalytic layer 20 is much smaller than 1.47, platinum 26 may make an interlayer transfer to be alloyed with rhodium 30. Besides, if the aforementioned Y is much larger than 2.0, the sintering of platinum 26 may be promoted.

The first carrier 28 according to the aforementioned rhodium catalytic layer 22 constituting the exhaust emission control catalyst 10 disclosed herein is preferably constituted mainly of at least one of $CeO_2$, $ZrO_2$, and $Al_2O_3$. Besides, the first carrier 28 can include other constituent compounds, for example, BaO, $Pr_6O_{11}$, $Nd_2O_3$, $La_2O_3$, $Y_2O_3$, $SiO_2$, MgO, SrO, $P_2O_7$ and the like. The oxides constituting the aforementioned first carrier 28 can be used alone or as a mixture. In addition, a composite (or solidified and solubilized) oxide constituted of two or more oxides can also be used.

Among the aforementioned oxides, $Al_2O_3$ and $ZrO_2$ are preferably used from the standpoint of having high heat resistance and high specific surface area. Besides, other composite oxides (e.g., a $CeO_2$—$ZrO_2$—$Al_2O_3$ composite oxide and the like) that contain $CeO_2$, a $CeO_2$—$ZrO_2$ composite oxide (or a solid solution) or $CeO_2$ are preferably used from the standpoint of having a capacity to occlude/discharge oxygen. Besides, rare earth oxides such as $Pr_6O_{11}$, $Nd_2O_3$, $La_2O_3$, $Y_2O_3$ and the like are preferably used from the standpoint of having an effect of suppressing sintering. Furthermore, BaO is preferably used because the aforementioned carrier can be imparted with basicity, and from the standpoint of having a capacity to occlude NOx.

From the standpoint that rhodium 30 supported on the surface of the carrier can be held in a high dispersion state, it is desirable that the specific surface area (a specific surface area measured according to the BET method, the same will hold true hereinafter) of the carrier be sufficiently large. It is preferable that the specific surface area of the first carrier 28 be 10 to 500 m$^2$/g (more preferably 20 to 30 m$^2$/g, and still more preferably 50 to 200 m$^2$/g). If the specific surface area of the aforementioned first carrier 28 is much smaller than 10 m$^2$/g, the rhodium 30 supported on the carrier may be sintered. If the specific surface area of the carrier is much larger than 500 m$^2$/g, the heat resistance of the carrier itself may decrease.

It is preferable that the content by percentage accounted for by the aforementioned $CeO_2$ in the aforementioned first carrier 28 be 10 to 40 mass % (more preferably 20 to 40 mass %, and still more preferably 25 to 35 mass %), that the content by percentage of the aforementioned $ZrO_2$ be 20 to 40 mass % (more preferably 25 to 35 mass %), and that the content by percentage of the aforementioned $Al_2O_3$ be 20 to 60 mass % (more preferably 20 to 50 mass %, still more preferably 20 to 40 mass %, and still much more preferably 25 to 35 mass %) if the aforementioned first carrier 28 according to the aforementioned rhodium catalytic layer 22 is assumed to be 100 mass %. If the content by percentage accounted for by $CeO_2$ in the aforementioned first carrier 28 is much smaller than 10 mass %, the value of X in the aforementioned rhodium catalytic layer 22 may become too large (or the basicity of the aforementioned first carrier 28 may become insufficient), and the effect of oxygen occlusion/discharge capacity (OSC) is unlikely to be obtained. Besides, if the content by percentage of the aforementioned $CeO_2$ is much larger than 40 mass %, the heat resistance of the exhaust emission control catalyst 10 may decrease, and rhodium 30 may be sintered during use at high temperature. If the content by percentage accounted for by $Al_2O_3$ in the aforementioned first carrier 28 is much smaller than 20 mass %, the specific surface area of the aforementioned first carrier 28 tends to be small, and hence the supported rhodium 30 may be sintered. Besides, if the content by percentage of the aforementioned $Al_2O_3$ is much larger than 60 mass %, the value of X in the aforementioned rhodium catalytic layer 22 tends to be too large (or the acidity of the aforementioned first carrier 28 tends to be too high), and the sintering of rhodium 30 supported on the carrier may be promoted.

The second carrier 24 according to the aforementioned platinum catalytic layer 20 constituting the exhaust emission control catalyst 10 disclosed herein is preferably constituted mainly of $Al_2O_3$ and/or $SiO_2$. Besides, the second carrier 24 can include other constituent compounds, for example, BaO, $Pr_6O_{11}Nd_2O_3$, $La_2O_3$, $Y_2O_3$, $CeO_2$, $ZrO_2$, MgO, SrO, $P_2O_7$ and the like. The aforementioned oxides can be used alone or as a mixture. In addition, a composite (or solidified and solubilized) oxide constituted of two or more oxides can also be used. Among the compounds constituting the aforementioned second carrier 24, $Al_2O_3$ and $SiO_2$ are preferably used from the standpoint that the constituent elements except oxygen have a relatively large electronegativity and are excellent in heat resistance. Besides, rare earth oxides such as $Pr_6O_{11}$, $Nd_2O_3$, $La_2O_3$, $Y_2O_3$ and the like are preferably used from the standpoint of having an effect of suppressing sintering.

From the standpoint that platinum 26 supported on the surface of the carrier can be held in a high dispersion state, it is desirable that the specific surface area of the carrier be sufficiently large. It is preferable that the specific surface area of the second carrier 24 be 10 to 500 $m^2/g$ (more preferably 20 to 300 $m^2/g$, and still more preferably 50 to 200 $m^2/g$). If the specific surface area of the aforementioned second carrier 24 is much smaller than 10 $m^2/g$, the platinum 26 supported on the carrier may be sintered. If the specific surface area of the carrier is much larger than 500 $m^2/g$, the heat resistance of the carrier itself may decrease.

It is preferable that the content by percentage accounted for by the aforementioned $Al_2O_3$ in the aforementioned second carrier 24 be 20 to 70 mass % (more preferably 20 to 50 mass %), and that the content by percentage accounted for by the aforementioned $SiO_2$ be 30 to 80 mass % (more preferably 50 to 80 mass %) if the aforementioned second carrier 24 in the aforementioned platinum catalytic layer 20 is assumed to be 100 mass %. Besides, it is preferable that the content by percentage of the aforementioned $CeO_2$ be equal to or smaller than 10 mass % (more preferably equal to or smaller than 5 mass %, further equal to or smaller than 3 mass %, and still further equal to or smaller than 1 mass %, and still more preferably the aforementioned second carrier 24 substantially not containing $CeO_2$). Besides, it is preferable that the content by percentage of the aforementioned $ZrO_2$ be equal to or smaller than 10 mass % (more preferably equal to or smaller than 5 mass %, further equal to or smaller than 3 mass %, and still further equal to or smaller than 1 mass %, and still more preferably the aforementioned second carrier 24 substantially not containing $ZrO_2$).

If the content by percentage accounted for by $Al_2O_3$ in the aforementioned second carrier 24 is much smaller than 20 mass %, the specific surface area of the carrier tends to decrease, and furthermore, the heat resistance of the catalyst itself may also decrease. Besides, if the content by percentage accounted for by $SiO_2$ in the aforementioned second carrier 24 is much larger than 80 mass %, the specific surface area of the carrier tends to be insufficient, and hence the platinum 26 supported on the carrier may be sintered. If the content by percentage accounted for by $CeO_2$ in the aforementioned second carrier 24 is much larger than 10 mass %, the value of Y in the aforementioned platinum catalytic layer 20 tends to be small (or the basicity of the aforementioned second carrier 24 tends to be too high), and platinum 26 may make an interlayer transfer in this exhaust emission control catalyst 10. Therefore, this option is unfavorable. If the content by percentage accounted for by $ZrO_2$ in the aforementioned second carrier 24 is much larger than 10 mass % as well as in the case of the aforementioned $CeO_2$, the value of Y in the aforementioned platinum catalytic layer 20 tends to be small, and platinum 26 may make an interlayer transfer. Therefore, this option is unfavorable.

The aforementioned rhodium catalytic layer 22 constituting the exhaust emission control catalyst 10 disclosed herein includes Rh particles 30. Besides, the aforementioned platinum catalytic layer 20 constituting the exhaust emission control catalyst 10 disclosed herein includes Pt particles 26. It is preferable that these catalytic metals (typically the Rh particles 30 and the Pt particles 26) have a sufficiently small particle diameter, from the standpoint of ensuring a sufficient area of contact with exhaust gas. It is preferable that the average particle diameter of the aforementioned noble metal (the average of particle diameters obtained through the TEM observation, the same will hold true hereinafter) be 1 to 20 nm (more preferably equal to or smaller than 15 nm, still more preferably equal to or smaller than 10 nm, and still much more preferably equal to or smaller than 5 nm).

The amount of the Rh particles 30 supported on the aforementioned rhodium catalytic layer 22 and the amount of the Pt particles 26 supported on the aforementioned platinum catalytic layer 20 are not limited in particular, but are suited to be 0.05 to 3 mass % (preferably 0.1 to 2 mass %, and more preferably 0.1 to 1.5 mass %) respectively for the carriers in the respective layers. If the amount of the Rh particles 30 in the aforementioned rhodium catalytic layer 22 or the amount of the Pt particles 26 in the aforementioned platinum catalytic layer 20 is much smaller than a corresponding one of the aforementioned ranges, the catalytic activity resulting from the catalytic metals is unlikely to be obtained. Therefore, this option is unfavorable. Besides, if the amount of the supported catalytic metals is larger than the aforementioned range, the grain growth of the catalytic metals is likely to occur during use of the catalyst at high temperature, and also a disadvantage arises in terms of cost.

The method of having the Rh particles 30 supported on the first carrier 28 in the aforementioned rhodium catalytic layer 22 or the method of having the Pt particles 26 supported on the second carrier 24 in the aforementioned platinum catalytic layer 20 is not limited in particular. For example, an impregnation method or an adsorption method can be employed. In a method of supporting a catalytic metal based on a typical impregnation method, an aqueous solution containing rhodium salt or platinum salt is impregnated with carrier powder, and then dried and calcined to make preparation possible. The appropriate calcination temperature at this time is about 300 to 700° C. If the calcination temperature is much higher than 700° C., the grain growth of the catalytic metal supported on the carrier may progress. Therefore, this option is unfavorable. Besides, if the calcination temperature is much lower than 300° C., the calcination time tends to be prolonged, and the manufacturing efficiency decreases. Therefore, this option is unfavorable.

The aforementioned rhodium catalytic layer 22 and the aforementioned platinum catalytic layer 20 may be equipped with palladium (Pd), ruthenium (Ru), osmium (Os), iridium (Ir) and the like as catalytic metals, in addition to the aforementioned rhodium 30 and the aforementioned platinum 26.

The method of manufacturing the exhaust emission control catalyst 10 having a laminate structure in which the catalytic layer 32 has an upper layer and a lower layer, as one embodiment of the exhaust emission control catalyst 10 disclosed herein is not limited in particular, and a conventionally employed method can be used. For example, in a manufacturing method based on a wash-coat method using a slurry, first of all, the surface of the above-mentioned substrate (typically the honeycomb substrate 12) is wash-coated with a slurry including components of the aforementioned platinum catalytic layer 20 as the lower layer, dried, and calcined. Subsequently, the surface of the lower layer is wash-coated with a slurry including components of the aforementioned rhodium catalytic layer 22 as the upper layer, dried and calcined. Thus, the aforementioned exhaust emission control catalyst 10 having the upper layer and the lower layer can be manufactured. The condition of drying and calcining the slurry in this case depends on the shape and dimension of the substrate or the carrier. Typically, however, it is preferable that the slurry be dried at about 80 to 120° C. (e.g., 100 to 110° C.) for about 1 to 10 hours. Furthermore, it is preferable that the slurry be calcined at about 400 to 900° C. (e.g., 500 to 700° C.) for about 2 to 4 hours.

The aforementioned slurry for the lower layer or the aforementioned slurry for the upper layer can be made to contain an appropriate amount of a binder (e.g., alumina sol, silica sol or the like), with a view to enhancing the adhesiveness of the slurry. Besides, the viscosity of the slurry should be set such that the slurry can easily flow into the cells 14.

The molding amount of the aforementioned catalytic layer 32 is not limited in particular. However, for example, it is preferable that the total amount of the aforementioned rhodium catalytic layer 22 and the aforementioned platinum catalytic layer 20 be 10 to 500 g (more preferably 50 to 300 g, and still more preferably 100 to 200 g) per volume of 1 L, of the honeycomb substrate 12. If the amount of the catalytic layer 32 per 1 L of the substrate is much smaller than 10 g, the function as the catalytic carrier is weak, and the supported catalytic metals may be sintered. Besides, if the amount of the aforementioned catalytic layer 32 exceeds 500 g, a rise in the pressure loss during the passage of exhaust gas in the cells 14 of the honeycomb substrate 12 may be caused.

Some Examples relating to the invention will be described hereinafter. However, the invention is not intended to be limited to those which are indicated by these concrete examples.

Examples of Manufacturing Exhaust Emission Control Catalysts

Example 1

First of all, second carrier powder on which platinum particles for a lower layer (a Pt layer) are supported was prepared. Specifically, 5 g of ceria ($CeO_2$) powder, 5 g of zirconia ($ZrO_2$) powder, and 40 g of alumina ($Al_2O_3$) powder were weighed per 1 L of the substrate, and a solution was prepared by dispersing these powders in a suitable amount of distilled water. Then, a dinitrodiammine platinum nitrate solution having a suitable concentration was prepared, and mixed with the aforementioned dispersion liquid. In this case, the platinum atom conversion amount in the mixed dinitrodiammine platinum nitrate solution was made to become equal to 1.1 mass % for the total amount of various oxides in the aforementioned dispersion liquid (1.0 g if converted into a mass of platinum per 1 L of the substrate). The obtained compound liquid was stirred for 2 hours, dried at 130° C. for 3 hours, and thereafter calcined at 500° C. for 1 hour to prepare Pt particle support powder.

Then, first carrier powder on which rhodium particles for an upper layer (an Rh layer) are supported was prepared. Specifically, 30 g of ceria powder, 30 g of zirconia powder, and 30 g of alumina powder were weighed per 1 L of the substrate, and a dispersion liquid was prepared by dispersing these powders in a suitable amount of distilled water. Then, a rhodium nitrate solution having a suitable concentration was prepared, and mixed with the aforementioned dispersion liquid. In this case, the rhodium atom conversion amount in the mixed rhodium nitrate solution was made to become equal to 0.4 mass % for the total amount of various oxides in the aforementioned dispersion liquid (0.2 g if converted into a mass of rhodium per 1 L of the substrate). The obtained compound liquid was stirred for 2 hours, dried at 130° C. for 3 hours, and thereafter calcined at 500° C. for 1 hour to prepare Rh particle support powder.

A slurry for the lower layer was prepared by mixing a suitable amount of distilled water With Pt particle support powder for the aforementioned lower layer (the Pt layer). Besides, a slurry for the upper layer was prepared by mixing a suitable amount of distilled water with Rh particle support powder for the aforementioned upper layer (the Rh layer).

A ceramic honeycomb having rectangular cells (3.5 mil/ 600 cpsi, φ103 mm×L 105 mm) was prepared as the substrate. The surface of the honeycomb substrate was wash-coated with the aforementioned slurry for the lower layer, dried at 100° C. for 1 hour, and thereafter calcined at 500° C. for 1 hour to form the lower layer (the Pt layer) of the exhaust emission control catalyst.

Subsequently, the surface of the aforementioned lower layer was wash-coated with the aforementioned slurry for the upper layer, dried at 100° C. for 1 hour, and calcined at 500° C. for 1 hour to form the upper layer (the Rh layer) of the exhaust emission control catalyst.

An exhaust emission control catalyst manufactured through the aforementioned series of processes is defined as an exhaust emission control catalyst according to Example 1.

Examples 2 to 7, Comparative Examples 1 to 4

In compliance with the process of manufacturing the exhaust emission control catalyst according to the aforementioned Example 1, exhaust emission control catalysts according to Examples 2 to 7 and Comparative Examples 1 to 4 were manufactured. The mixed quantities (g/substrate-L) of various oxides per 1 L of the substrate in manufacturing the carriers of the respective catalytic layers in the aforementioned exhaust emission control catalysts are shown in Table 2. In this case, in the exhaust emission control catalysts according to all the Examples and all the Comparative Examples, the amount of platinum supported on the lower layer (the Pt layer) was set to 1.0 g/substrate-L, and the amount of rhodium supported on the upper layer (the Rh layer) was set to 0.2 g/substrate-L.

TABLE 2

|  | Catalytic Layer | Mixed Quantity Of CeO$_2$ | ZrO$_2$ | Carrier Al$_2$O$_3$ | Raw Material (g/ substrate - L) SiO$_2$ |
|---|---|---|---|---|---|
| Example 1 | Rh layer | 30 | 30 | 30 | 0 |
|  | Pt layer | 5 | 5 | 40 | 0 |
| Example 2 | Rh layer | 30 | 30 | 30 | 0 |
|  | Pt layer | 0 | 0 | 50 | 0 |
| Example 3 | Rh layer | 30 | 30 | 30 | 0 |
|  | Pt layer | 0 | 0 | 50 | 10 |
| Example 4 | Rh layer | 30 | 30 | 30 | 0 |
|  | Pt layer | 0 | 0 | 30 | 20 |
| Example 5 | Rh layer | 30 | 30 | 30 | 0 |
|  | Pt layer | 0 | 0 | 15 | 35 |
| Example 6 | Rh layer | 10 | 30 | 50 | 0 |
|  | Pt layer | 5 | 5 | 40 | 0 |
| Example 7 | Rh layer | 45 | 30 | 15 | 0 |
|  | Pt layer | 5 | 5 | 40 | 0 |
| Comparative Example 1 | Rh layer | 3 | 7 | 50 | 0 |
|  | Pt layer | 30 | 30 | 25 | 0 |
| Comparative Example 2 | Rh layer | 3 | 7 | 50 | 0 |
|  | Pt layer | 5 | 5 | 40 | 0 |
| Comparative Example 3 | Rh layer | 30 | 30 | 30 | 0 |
|  | Pt layer | 10 | 10 | 30 | 0 |

TABLE 2-continued

|  | Catalytic Layer | Mixed Quantity Of CeO$_2$ | ZrO$_2$ | Carrier Al$_2$O$_3$ | Raw Material (g/ substrate - L) SiO$_2$ |
|---|---|---|---|---|---|
| Comparative Example 4 | Rh layer | 60 | 20 | 10 | 0 |
|  | Pt layer | 5 | 5 | 40 | 0 |

⟨Calculation of Mole Average of Electronegativity⟩

Composition ratios (mass %) of the carriers in the respective catalytic layers as to the obtained exhaust emission control catalysts are shown in Table 3. In this case, mole averages (X or Y) of the Pauling's electronegativity calculated as to the elements included in the respective catalytic layers except platinum group elements and oxygen are shown in Table 3, Specifically, the aforementioned X (or Y) was calculated as follows.

Concrete Example of Calculation Method: As to X According to Example 1

Mole % of ceria, zirconia and alumina contained in the rhodium catalytic layer of the exhaust emission control catalyst according to Example 1 are calculated as 24.48 mol % (CeO$_2$), 34.20 mol % (ZrO$_2$), and 41.31 mol % (Al$_2$O$_3$) from the mixed quantities of the respective oxides shown in Table 2 and molecular weights of the respective oxides.

In this case, X is obtained from the sum of (products of the electronegativity and mole concentration of the respective elements). Therefore, specifically, X according to Example 1 is calculated as follows, using the values of the electronegativity shown in Table 1.

$$X=(1.1\times24.48(\text{mol}\%)+1.4\times34.20(\text{mol}\%)+1.5\times41.31(\text{mol}\%))/100=1.37(\text{three effective digits})$$

TABLE 3

|  | Catalytic Layer | Composition Ratio CeO$_2$ | (Mass %) of ZrO$_2$ | Carrier in Al$_2$O$_3$ | Each Catalytic Layer SiO$_2$ | Mole Average of Electronegativity | Nox 50% Purification Temperature (° C.) |
|---|---|---|---|---|---|---|---|
| Example 1 | Rh layer | 33 | 33 | 33 | 0 | (X) 1.37 | 365 |
|  | Pt layer | 10 | 10 | 80 | 0 | (Y) 1.47 |  |
| Example 2 | Rh layer | 33 | 33 | 33 | 0 | (X) 1.37 | 360 |
|  | Pt layer | 0 | 0 | 100 | 0 | (Y) 1.50 |  |
| Example 3 | Rh layer | 33 | 33 | 33 | 0 | (X) 1.37 | 353 |
|  | Pt layer | 0 | 0 | 83 | 17 | (Y) 1.58 |  |
| Example 4 | Rh layer | 33 | 33 | 33 | 0 | (X) 1.37 | 348 |
|  | Pt layer | 0 | 0 | 60 | 40 | (Y) 1.66 |  |
| Example 5 | Rh layer | 33 | 33 | 33 | 0 | (X) 1.37 | 345 |
|  | Pt layer | 0 | 0 | 30 | 70 | (Y) 1.74 |  |
| Example 6 | Rh layer | 11 | 33 | 56 | 0 | (X) 1.44 | 370 |
|  | Pt layer | 10 | 10 | 80 | 0 | (Y) 1.47 |  |
| Example 7 | Rh layer | 50 | 33 | 17 | 0 | (X) 1.30 | 372 |
|  | Pt layer | 10 | 10 | 80 | 0 | (Y) 1.47 |  |
| Comparative Example 1 | Rh layer | 5 | 12 | 83 | 0 | (X) 1.48 | 380 |
|  | Pt layer | 35 | 35 | 29 | 0 | (Y) 1.36 |  |
| Comparative Example 2 | Rh layer | 5 | 12 | 83 | 0 | (X) 1.48 | 375 |
|  | Pt layer | 10 | 10 | 80 | 0 | (Y) 1.47 |  |
| Comparative Example 3 | Rh layer | 33 | 33 | 33 | 0 | (X) 1.37 | 372 |
|  | Pt layer | 20 | 20 | 60 | 0 | (Y) 1.43 |  |
| Comparative Example 4 | Rh layer | 67 | 22 | 11 | 0 | (X) 1.24 | 380 |
|  | Pt layer | 10 | 10 | 80 | 0 | (Y) 1.47 |  |

⟨Durability Treatment⟩

The obtained exhaust emission control catalysts according to Examples 1 to 7 and Comparative Examples 1 to 4 were subjected to a durability treatment. Specifically, the aforementioned exhaust emission control catalysts were put into an electric furnace, and heated in the air at 950° C. for 50 hours.

⟨Evaluation of Purification Performance⟩

The purification performance for nitrogen oxides (NOx) was evaluated as to the aforementioned exhaust emission control catalysts subjected to the durability treatment. Specifically, the aforementioned exhaust emission control catalysts were installed on an evaluation device, a gas with an air-fuel ratio (A/F) of 14.6 was caused to flow into the aforementioned exhaust emission control catalysts at a gas flow rate of 15 L/min while being heated up at a heat-up speed of 10° C./min, and concentrations of NOx at an outlet were measured. In this case, temperatures at which 50 mol % of NOx at the time of gas infusion decreased through purification by the exhaust emission control catalysts (NOx 50% purification temperatures (° C.)) were calculated.

A result of the obtained NOx 50% purification temperatures is shown in Table 3. It should be noted herein that the NOx purification performance is meant to be improved as the NOx 50% purification temperature falls.

Figure 3:
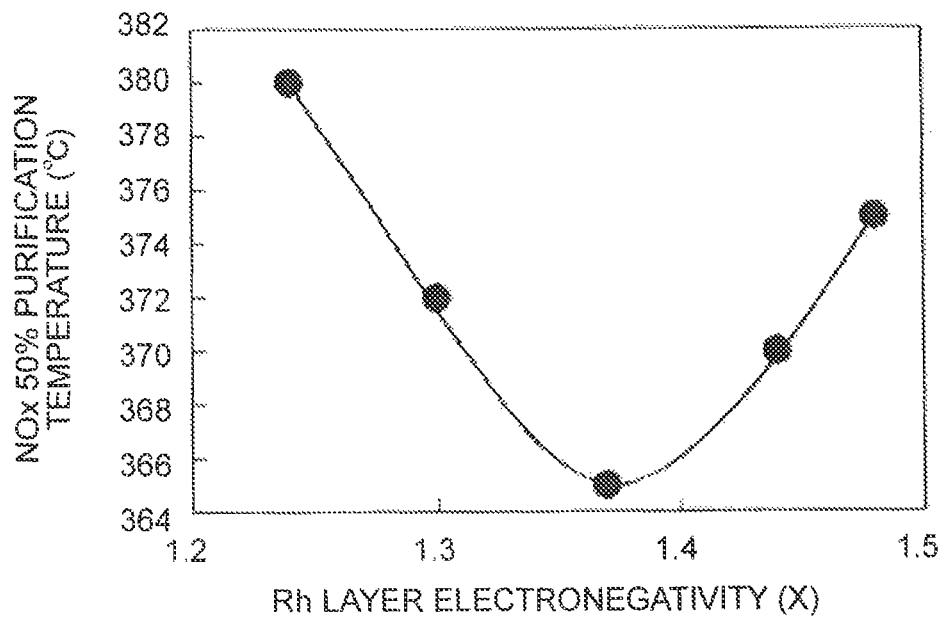
FIG. 3 is a view showing a relationship between a value of X according to a rhodium catalytic layer and NOx purification performance in the case where a value of Y according to a platinum catalytic layer is set to 1.47 (an axis of ordinate: NOx 50% purification temperature (° C.), an axis of abscissa: X).

In order to investigate a relationship between the mole average (X) of the electronegativity according to the aforementioned rhodium catalytic layer and the NOx purification performance as to the exhaust emission control catalysts according to Examples and Comparative Examples, FIG. 3 shows the NOx 50% purification temperature at the time when X according to the aforementioned rhodium catalytic layer is changed from 1.24 to 1.48 while the mole average (Y) of the electronegativity according to the aforementioned platinum catalytic layer is under a constant condition of being 1.47.

As is apparent from a result shown in FIG. 3, it was confirmed that the NOx 50% purification temperature has a local minimum value within a range where X is 1.35 to 1.40 if the value of Y is set to 1.47. Specifically, the NOx 50% purification temperature substantially indicated 373° C. or less in the range of $1.30 \leq X \leq 1.45$, and furthermore, the temperature substantially indicated 367° or less in the range of $1.35 \leq X \leq 1.40$. That is, it was confirmed that the preferable range of X is $1.30 \leq X \leq 1.45$ (more preferably $1.35 \leq X \leq 1.40$). The NOx purification performance of the exhaust emission control catalysts improved when X was within the aforementioned range, because the sintering of rhodium was effectively suppressed in the rhodium catalytic layer within the aforementioned range.

Figure 4:
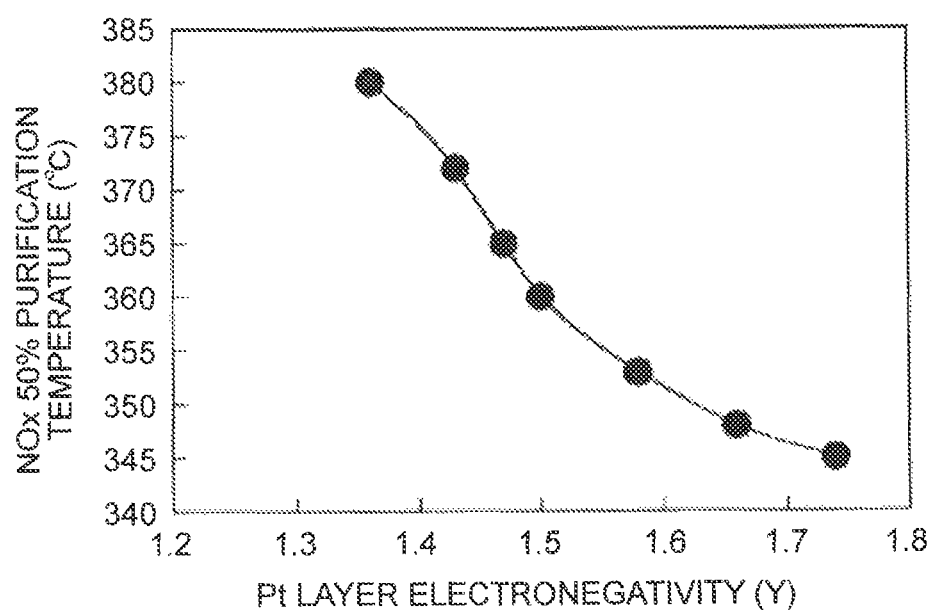
FIG. 4 is a view showing a relationship between the value of Y according to the platinum catalytic layer and NOx purification performance in the case where the value of X according to the rhodium catalytic layer is set to 1.37 (an axis of ordinate: NOx 50% purification temperature (° C.), an axis of abscissa: Y).

Next, in order to investigate a relationship between the mole average Y of the electronegativity according to the aforementioned platinum catalytic layer and the NOx purification performance, FIG. 4 shows the NOx 50% purification temperature at the time when Y according to the aforementioned platinum catalytic layer is changed from 1.36 to 1.74 while X according to the aforementioned rhodium catalytic layer assumes a constant value, namely, 1.37.

As is apparent from a result shown in FIG. 4, it was confirmed that the NOx 50% purification temperature tends to fall and the purification performance tends to improve as the value of Y increases from 1.36 when the value of X is set to 1.37. Specifically, the NOx 50% purification temperature substantially indicated 372° C. or less in the range of $Y \geq 1.43$, the temperature substantially indicated 365° C. or less in the range of $Y \geq 1.47$, the temperature substantially indicated 350° C. or less in the range of $Y \cong 1.60$, and furthermore the temperature substantially indicated 346° C. or less in the range of $Y \geq 1.70$. That is, it was confirmed that the preferable range of Y is $Y \geq 1.43$ (more preferably $Y \geq 1.47$, still more preferably $Y \geq 1.60$, and still much more preferably $Y \geq 1.70$). The exhaust emission control catalysts exerted high NOx purification performance when Y was within the aforementioned range, because an interlayer transfer of platinum and/or rhodium and the alloying of both the metals were suppressed within the aforementioned range.

INDUSTRIAL APPLICABILITY

According to the invention, an exhaust emission control catalyst with excellent purification performance can be provided by restraining a catalyst from deteriorating due to the alloying of catalytic metals.

The invention claimed is:

1. An exhaust emission control catalyst comprising:
a substrate; and
a catalytic layer that is formed on a surface of the substrate, wherein
the catalytic layer comprises a rhodium catalytic layer, which includes a first carrier and rhodium supported on the first carrier, and a platinum catalytic layer, which includes a second carrier and platinum supported on the second carrier,
the first carrier in the rhodium catalytic layer includes $CeO_2$, $ZrO_2$ and $Al_2O_3$ and
a relationship between a mole average (X) of a Pauling's electronegativity that is calculated as to elements included in the rhodium catalytic layer except platinum group elements and oxygen and a mole average (Y) of a Pauling's electronegativity that is calculated as to elements included in the platinum catalytic layer except platinum group elements and oxygen is
$1.30 \leq X \leq 1.45$ and $1.47 \leq Y \leq 2.0$.

2. The exhaust emission control catalyst according to claim 1, wherein
the platinum catalytic layer is formed on the surface of the substrate in the catalytic layer, and the rhodium catalytic layer is formed on a surface of the platinum catalytic layer that is not in contact with the substrate in the catalytic layer, so that the catalytic layer is formed in a laminate structure.

3. The exhaust emission control catalyst according to claim 1, wherein
the second carrier in the platinum catalytic layer includes at least one of $Al_2O_3$ and $SiO_2$.

4. The exhaust emission control catalyst according claim 1, wherein
a mass amount of $CeO_2$ in the second carrier is equal to or smaller than 10 mass % based on the total mass amount of the second carrier in the platinum catalytic layer.

5. The exhaust emission control catalyst according to claim 1, wherein
the second carrier in the platinum catalytic layer does not substantially contain $CeO_2$.

6. The exhaust emission control catalyst according to claim 1, wherein
the second carrier in the platinum catalytic layer does not substantially contain $ZrO_2$.

7. The exhaust emission control catalyst according claim 1, wherein
a mass amount of $Al_2O_3$ in the second carrier is 20 to 70 mass %, and a mass amount of $SiO_2$ is 30 to 80 mass % based on the total mass amount of the second carrier in the platinum catalytic layer.

8. The exhaust emission control catalyst according claim 1, wherein a mass amount of $CeO_2$ in the first carrier is 10 to 40 mass %, a mass amount of $ZrO_2$ is 20 to 40 mass %, and a mass amount of $Al_2O_3$ is 20 to 60 mass % based on the total mass amount of the first carrier in the rhodium catalytic layer.

9. The exhaust emission control catalyst according to claim 1, wherein the mole average (X) is $1.30 \leq X \leq 1.4$.

10. The exhaust emission control catalyst according to claim 1, wherein the mole average (Y) is $1.60 \leq Y \leq 2.0$.

* * * * *